US010291063B1

(12) United States Patent
Feare (10) Patent No.: US 10,291,063 B1
(45) Date of Patent: May 14, 2019

(54) CELL PHONE CASE WITH INTEGRATED SOLAR CELLS

(71) Applicant: Norris Feare, Nantucket, MA (US)

(72) Inventor: Norris Feare, Nantucket, MA (US)

(*) Notice: Subject to any disclaimer, the term of this patent is extended or adjusted under 35 U.S.C. 154(b) by 12 days.

(21) Appl. No.: 15/854,182

(22) Filed: Dec. 26, 2017

(51) Int. Cl.
*H04B 1/38* (2015.01)
*H02J 7/35* (2006.01)
*H02J 7/00* (2006.01)
*H02S 40/32* (2014.01)
*H04B 1/3883* (2015.01)
*H02S 40/38* (2014.01)
*H04M 1/04* (2006.01)

(52) U.S. Cl.
CPC .............. *H02J 7/35* (2013.01); *H02J 7/0044* (2013.01); *H02S 40/32* (2014.12); *H02S 40/38* (2014.12); *H04B 1/3883* (2013.01); *H04M 1/04* (2013.01)

(58) Field of Classification Search
CPC ............. H02J 2007/0062; H02J 7/0045; H02J 7/0054; H02J 7/35; H02J 7/0052; H02J 7/045; H02J 7/007; H02J 7/0044; H02J 7/0013; H02J 7/0034; H04B 1/40; H04M 2001/0204
See application file for complete search history.

(56) References Cited

U.S. PATENT DOCUMENTS

| 8,277,246 | B2 | 10/2012 | Naskali | |
|---|---|---|---|---|
| D784,948 | S | 4/2017 | Brown, III | |
| 2003/0096642 | A1 | 5/2003 | Bessa | |
| 2008/0125188 | A1 | 5/2008 | Huang | |
| 2015/0207360 | A1 | 7/2015 | Adams | |
| 2015/0340895 | A1* | 11/2015 | Salvi | H02J 7/0052 320/107 |
| 2016/0028272 | A1 | 1/2016 | Dukes | |
| 2016/0329533 | A1* | 11/2016 | Tajima | H01M 2/0275 |
| 2017/0346321 | A1* | 11/2017 | Lemberg | H02J 7/0045 |
| 2018/0074550 | A1* | 3/2018 | Sorias | G06F 1/1632 |

FOREIGN PATENT DOCUMENTS

WO  2017013293  1/2017

* cited by examiner

*Primary Examiner* — Nhan T Le
(74) *Attorney, Agent, or Firm* — Kyle A. Fletcher, Esq.

(57) ABSTRACT

The cell phone case with integrated solar cells is a protective shell into which receives a first personal data device selected from a plurality of data devices. The cell phone case with integrated solar cells provides a charger plug that recharges a first battery of the first personal data device. The cell phone case with integrated solar cells further comprises a charger port. The charger port is configured for use with a second personal data device selected from the plurality of personal data devices. The charger port recharges a second battery of the second personal data device. The charger plug and the charger port are powered by a charger circuit. The charger circuit is a solar powered electrical circuit that provides a regulated voltage to the charger plug and the charger port.

18 Claims, 5 Drawing Sheets

CELL PHONE CASE WITH INTEGRATED SOLAR CELLS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity including circuit arrangements for supplying and distributing electric power, more specifically, a circuit arrangement for charging one or more batteries.

SUMMARY OF INVENTION

The cell phone case with integrated solar cells is configured for use with a plurality of personal data devices. The cell phone case with integrated solar cells is a protective shell into which is placed a first personal data device selected from the plurality of data devices. The first personal data device further comprises a first battery. The cell phone case with integrated solar cells further provides a charger plug that is used to recharge the first battery. The cell phone case with integrated solar cells further comprises a charger port. The charger port is configured for use with a second personal data device selected from the plurality of personal data devices. The second personal data device further comprises a second battery. The charger port is used to recharge the second battery. The charger plug and the charger port are powered by a charger circuit. The charger circuit is a solar powered electrical circuit. The charger circuit provides a regulated voltage to the charger plug and the charger port. The regulated voltage provides the electrical energy to charge the first battery and the second battery.

These together with additional objects, features and advantages of the cell phone case with integrated solar cells will be readily apparent to those of ordinary skill in the art upon reading the following detailed description of the presently preferred, but nonetheless illustrative, embodiments when taken in conjunction with the accompanying drawings.

In this respect, before explaining the current embodiments of the cell phone case with integrated solar cells in detail, it is to be understood that the cell phone case with integrated solar cells is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cell phone case with integrated solar cells.

It is therefore important that the claims be regarded as including such equivalent construction insofar as they do not depart from the spirit and scope of the cell phone case with integrated solar cells. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The cell phone case with integrated solar cells 100 (hereinafter invention) is configured for use with a plurality of personal data devices 150. The invention 100 is a protective shell 101 into which is placed a first personal data device 151 selected from the plurality of data devices. The first personal data device 151 further comprises a first battery 153. The invention 100 further provides a charger plug 103 that is used to recharge the first battery 153. The invention 100 further comprises a charger port 104. The charger port 104 is configured for use with a second personal data device 152 selected from the plurality of personal data devices 150. The second personal data device 152 further comprises a second battery 154. The charger port 104 is used to recharge the second battery 154. The charger plug 103 and the charger port 104 are powered by a charger circuit 102. The charger circuit 102 is a solar powered electrical circuit. The charger circuit provides a regulated voltage to the charger plug 103 and the charger port 104. The regulated voltage provides the electrical energy to charge the first battery 153 and the second battery 154.

Each of the plurality of personal data devices 150 is a logical device. Each of the plurality of personal data devices 150 provides data and communication services to a user. The use of a personal data device is well-known and documented in societies throughout the world. The plurality of personal data devices 150 comprises a first personal data device 151 and a second personal data device 152.

The first personal data device 151 is a programmable electrical device that provides data management and communication services through one or more functions referred to as an application. The application is a set of logical operating instructions that are performed by the first personal data device 151. The addition of an application will provide increased functionality for the first personal data device 151. The first personal data device 151 further comprises a first battery 153. The first battery 153 is further defined with a third positive terminal 203 and a third negative terminal 213. The first battery 153 is a chemical device that converts chemical energy into the electrical energy necessary to power the first personal data device 151.

The first battery 153 is a rechargeable battery associated with the first personal data device 151. The first battery 153 is a chemical device that converts chemical energy into the electrical energy necessary to power the first personal data device 151. The chemical energy stored within the first battery 153 is renewed and restored through the use of the charger plug 103. The charger plug 103 connects the charger circuit 102 to the first battery 153 such that the charger plug 103 reverses the polarity of the first battery 153 and provides the energy necessary to reverse the chemical processes that the first battery 153 initially used to generate the electrical energy. This reversal of the chemical process creates a chemical potential energy that will later be used by the first battery 153 to generate electricity.

The second personal data device 152 is a programmable electrical device that provides data management and communication services through one or more functions referred to as an application. The application is a set of logical operating instructions that are performed by the second personal data device 152. The addition of an application will provide increased functionality for the second personal data device 152. The second personal data device 152 further comprises a second battery 154. The second battery 154 is further defined with a fourth positive terminal 204 and a fourth negative terminal 214. The second battery 154 is a chemical device that converts chemical energy into the electrical energy necessary to power the second personal data device 152.

The second battery 154 is a rechargeable battery associated with the second personal data device 152. The chemical energy stored within the second battery 154 is renewed and restored through the use of the charger port 104. The charger port 104 connects the charger circuit 102 to the second battery 154 such that the charger port 104 reverses the polarity of the second battery 154 and provides the energy necessary to reverse the chemical processes that the second battery 154 initially used to generate the electrical energy. This reversal of the chemical process creates a chemical potential energy that will later be used by the second battery 154 to generate electricity.

The charger plug 103 is an electrical device that connects the charger circuit 102 to a USB port of the first personal data device 151. The charger plug 103 transfer electric power from the charger circuit 102 to the first battery 153 of the first personal data device 151. In the first potential embodiment of the disclosure, the charger plug 103 is a standard plug commonly referred to as a USB micro plug. The charger plug 103 mounts within the hollow space of the container 111. The charger plug 103 inserts into the first personal data device 151 as the first personal data device 151 is inserted into the protective shell 101. The charger plug 103 electrically connects to the first personal data device 151 for as long as the first personal data device 151 is installed in the protective shell 101. The charger plug 103 is further defined with a third lead 223 and a fourth lead 224.

The charger port 104 is an electrical device that connects the charger circuit 102 to a USB cable. The USB cable electrically connects the charger port 104 to the second battery 154 of the second personal data device 152. The charger port 104 is a standard port that receives a plug commonly referred to as a USB A plug. The charger port 104 is further defined with a fifth lead 225 and a sixth lead 226.

The protective shell 101 is a semi-rigid structure. The protective shell 101 is a hollow structure. The protective shell 101 forms the shape of a rounded rectangular block. The protective shell 101 forms a protective structure within which the first personal data device 151 is contained. The first personal data device 151 is contained within the hollow space formed by the protective shell 101. The protective shell 101 protects the first personal data device 151 from impact damage. The protective shell 101 comprises a container 111, a cavity 112, and a hinged door 113.

The container 111 is a semi-rigid structure that is sized to receive the first personal data device 151. The container 111 is a hollow structure. The semi-rigid structure of the container 111 forms a plurality of protective surfaces that protect the first personal data device 151 from impact and torque stresses. The use of a container 111 to protect a personal data device is well-known and documented in the mechanical arts. The container 111 comprises a device aperture 131 and a port aperture 132.

The device aperture 131 is an opening formed in a face of the container 111. The first personal data device 151 is inserted into the container 111 through the device aperture 131. The device aperture 131 provides access to the user interface of the first personal data device 151 when the first personal data device 151 is stored in the protective shell 101.

The port aperture 132 is an aperture formed through the container 111. The charger port 104 mounts in the port aperture 132 such that a USB plug inserts through the port aperture 132 into the charger port 104.

The cavity 112 is a negative space formed in the face of the container 111 that is distal from the face of the rectangular block structure of the container 111 that has the device aperture 131. The rear face is a surface of the cavity 112 that is distal from the barrier 141 when the hinged door 113 is closed. The cavity 112 does not form an aperture into the hollow interior of the container 111. The cavity 112 is sized to receive the first photovoltaic cell 121 and the second photovoltaic cell 122 when the hinged door 113 is in the closed position. The first photovoltaic cell 121 is permanently attached to the rear face of the cavity 112 such that the first photovoltaic cell 121 is exposed to light when the hinged door 113 is in an open position The hinged door 113 is a rotating plate that controls access to the cavity 112. If the hinged door 113 is rotated away from the cavity 112, the cavity 112 is said to be in an open position. If the hinged door 113 is positioned over the cavity 112, the cavity 112 is said to be in a closed position. The hinged door 113 is opened to initiate the operation of the charger circuit 102. The second photovoltaic cell 122 attaches to the interior surface of the hinged door 113. The hinged door 113 comprises a barrier 141 and a hinge 142. The barrier 141 is further defined with an interior surface and an exterior surface.

The barrier 141 is a plate structure. The barrier 141 is sized to enclose the cavity 112. The second photovoltaic cell 122 attaches to the surface of the barrier 141 that forms the interior surface of the cavity 112. The interior surface is the surface of the barrier 141 that forms an interior surface of the cavity 112 when the cavity 112 is enclosed by the barrier 141. The exterior surface is the surface of the barrier 141 that is distal from the interior surface.

The hinge 142 attaches the barrier 141 to the cavity 112 such that barrier 141 rotates in a manner that opens and closes the cavity 112. The use of a hinge 142 to mount a rotating barrier 141 over an aperture to a cavity 112 is well-known and documented in the mechanical arts.

Figure 1:
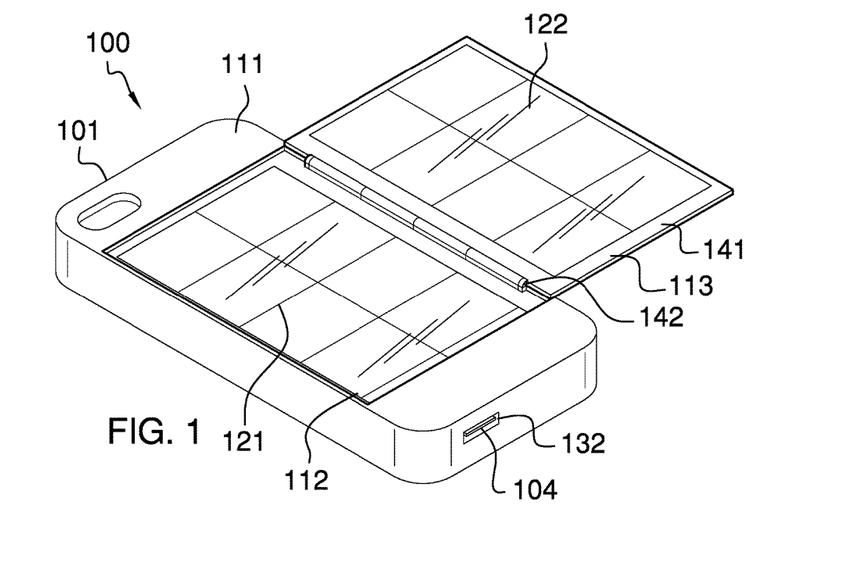
FIG. 1 is a perspective view of an embodiment of the disclosure.
Figure 2:
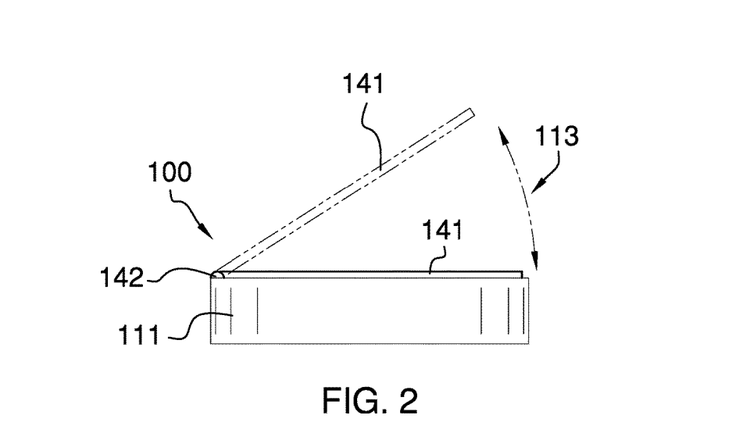
FIG. 2 is a top view of an embodiment of the disclosure.
Figure 3:
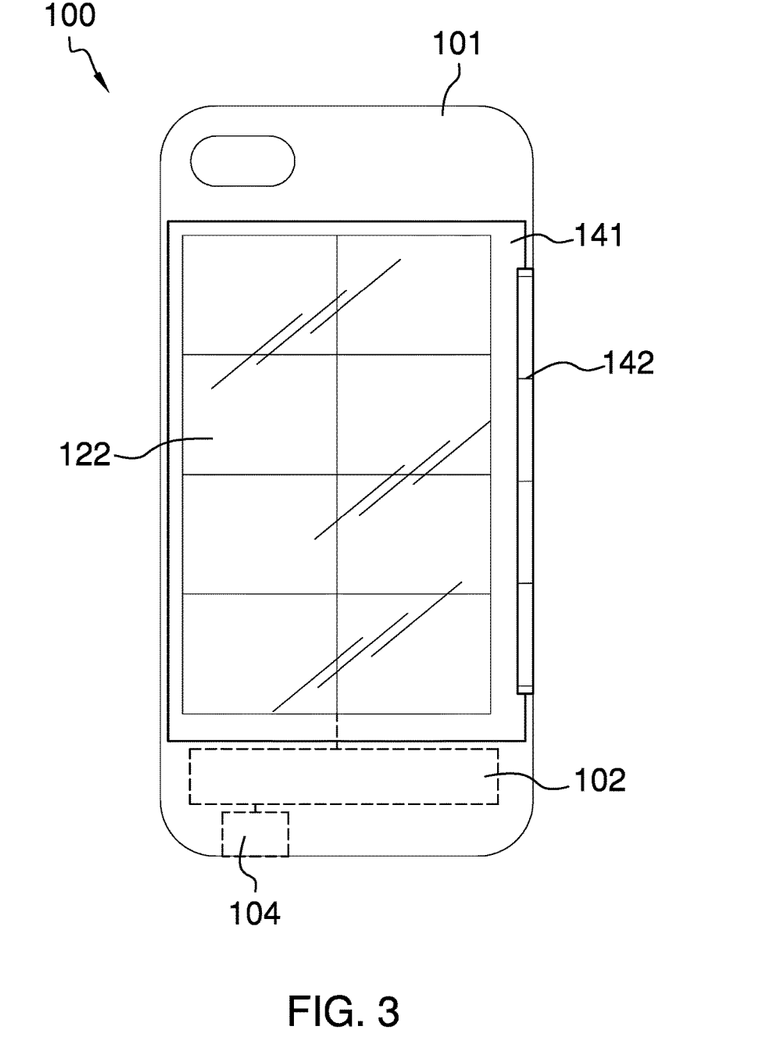
FIG. 3 is a rear closed view of an embodiment of the disclosure.
Figure 4:
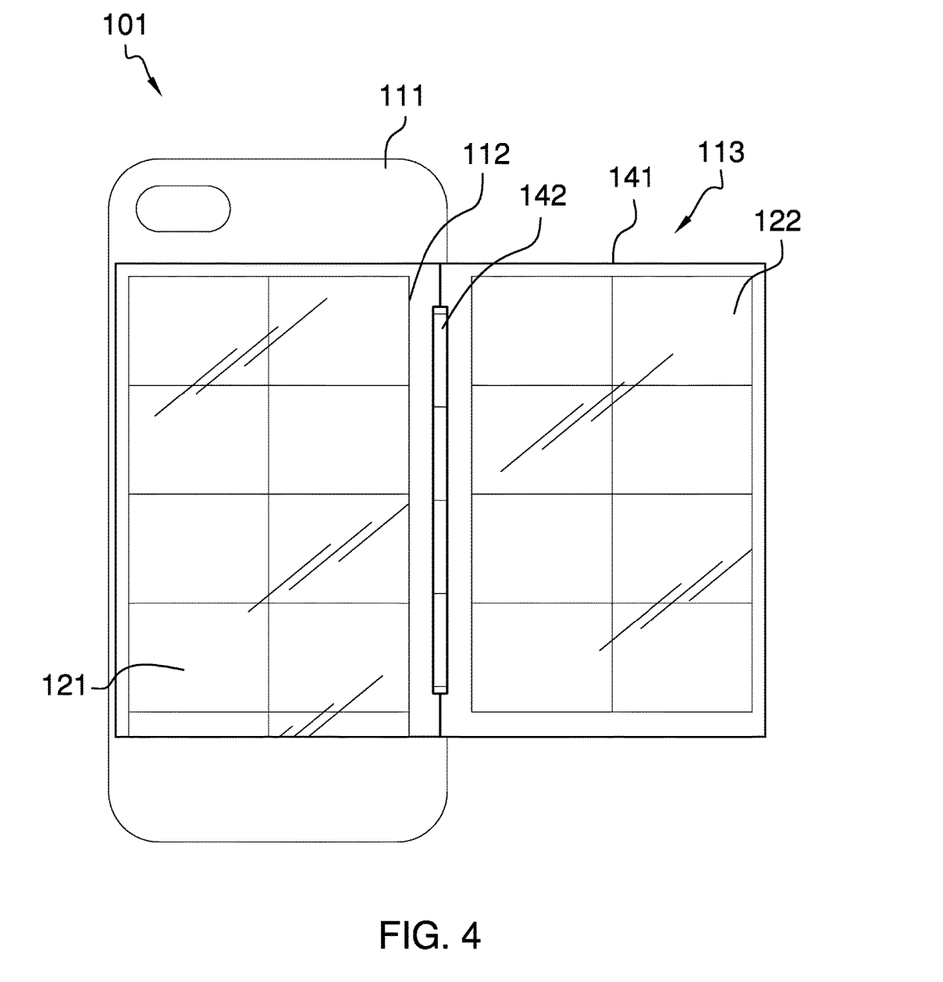
FIG. 4 is a rear open view of an embodiment of the disclosure.
Figure 5:
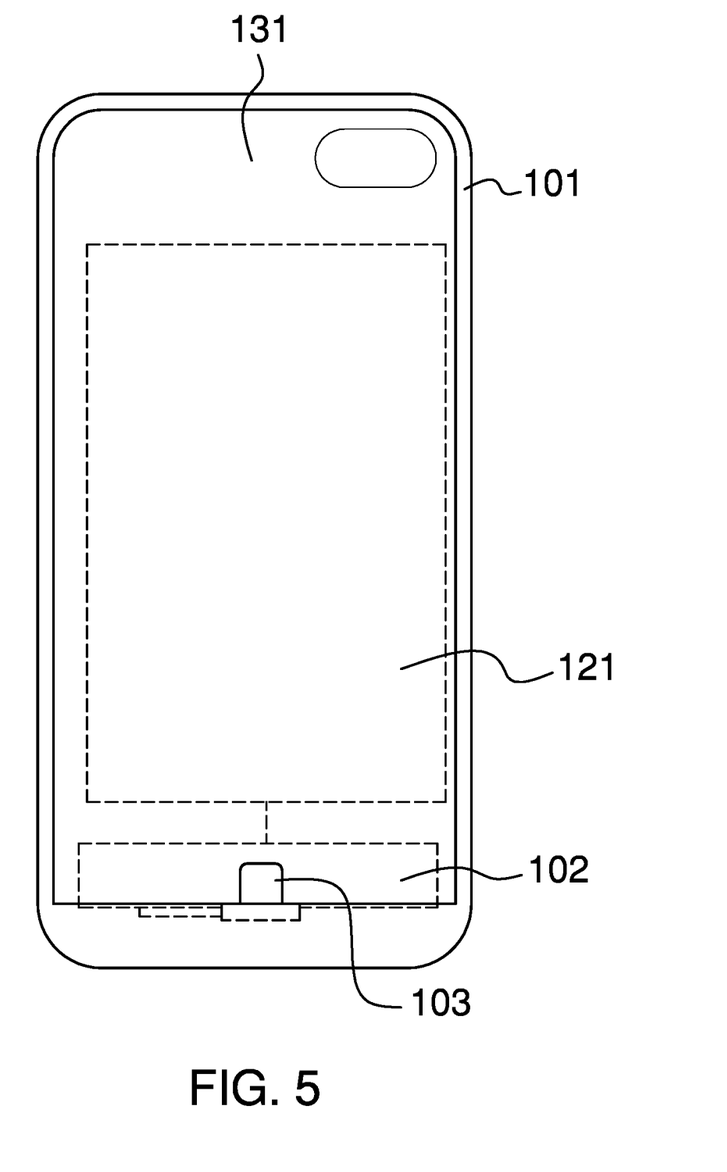
FIG. 5 is a front view of an embodiment of the disclosure.
Figure 6:
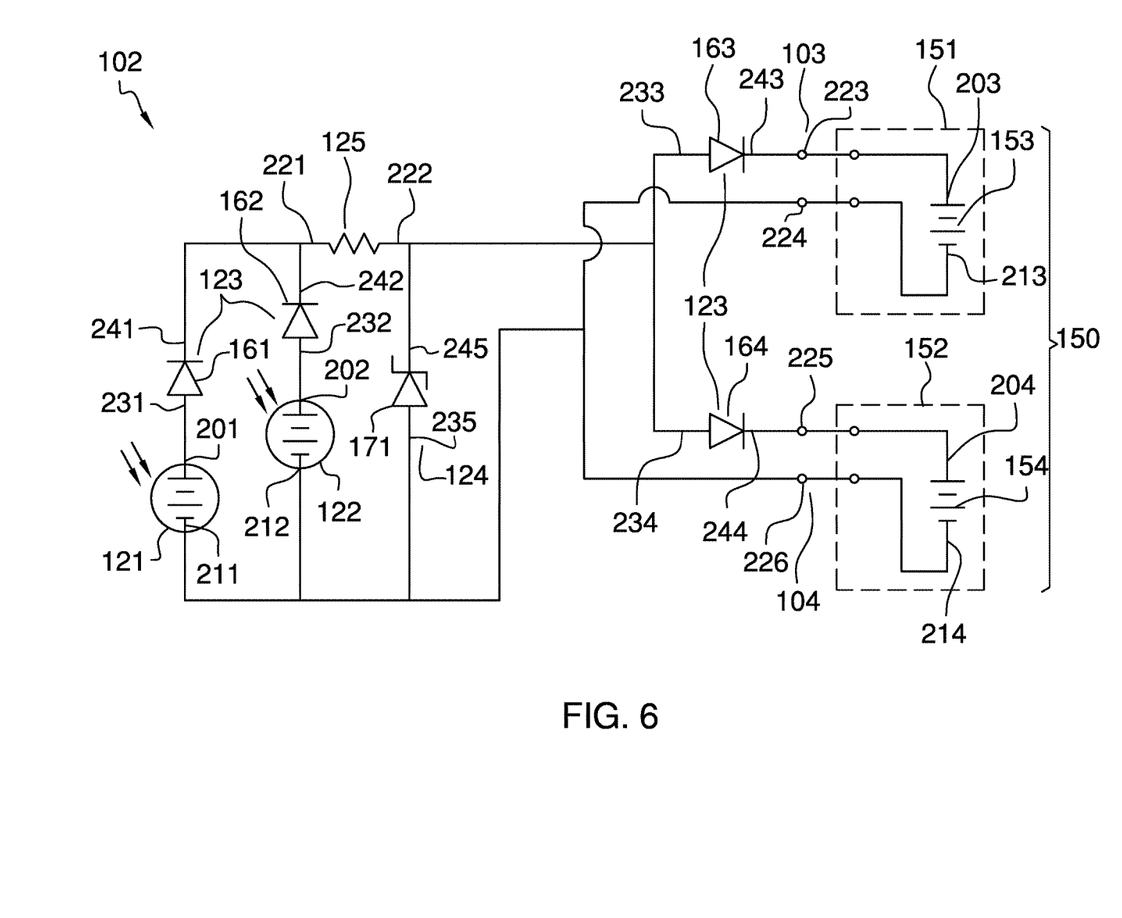
FIG. 6 is a schematic view of an embodiment of the disclosure.

The charger circuit 102 is an electrical circuit. The charger circuit 102 converts light into electrical energy that recharges the first battery 153 of the first personal data device 151 and the second battery 154 of the second personal data device 152. The charger circuit 102 presents a regulated voltage to the charger plug 103 and the charger port 104 such that the charger plug 103 will recharge the first battery 153 and the charger port 104 will recharge the second battery 154. The charger circuit 102 is sized such that the charger circuit 102 can simultaneously recharge the first battery 153 and the second battery 154. In the first potential embodiment of the disclosure, the charger circuit 102 is compatible with USB specifications for power distribution.

The charger circuit 102 comprises a first photovoltaic cell 121, a second photovoltaic cell 122, a plurality of diodes 123, a voltage regulator 124, and a limit resistor 125. The first photovoltaic cell 121 is further defined with a first positive terminal 201 and a first negative terminal 211. The second photovoltaic cell 122 is further defined with a second positive terminal 202 and a second negative terminal 212. The limit resistor 125 is further defined with a first lead 221 and a second lead 222.

The first photovoltaic cell 121 is an electrical device that directly converts light into electricity using the photoelectric effect. The second photovoltaic cell 122 is an electrical device that directly converts light into electricity using the photoelectric effect.

Each of the plurality of diodes 123 is an electrical device that limits the flow of electric current to a single direction. The plurality of diodes 123 are used to: 1) electrically isolate the first photovoltaic cell 121 and the second photovoltaic cell 122 from the voltage regulator 124; and, 2) electrically isolate the voltage regulator 124 from the charger plug 103 and the charger port 104. The use of a diode for this purpose is well-known and documented in the electrical arts.

The plurality of diodes 123 comprises a first diode 161, a second diode 162, a third diode 163, and a fourth diode 164. The first diode 161 is further defined with a first anode 231 and a first cathode 241. The second diode 162 is further defined with a second anode 232 and a second cathode 242. The third diode 163 is further defined with a third anode 233 and a third cathode 243. The fourth diode 164 is further defined with a fourth anode 234 and a fourth cathode 244.

The first diode 161 prevents the backflow of electric current into the first photovoltaic cell 121 from the second photovoltaic cell 122. The second diode 162 prevents the backflow of electric current of into the second photovoltaic cell 122 from the first photovoltaic cell 121. The third diode 163 prevents the backflow of electric current from the first battery 153 into the charger circuit 102. The fourth diode 164 prevents the backflow of electric current from the second battery 154 into the charger circuit 102.

The voltage regulator 124 is an electrical device. The voltage regulator 124 maintains a constant voltage at the charger plug 103 and the charger port 104. The purpose of the voltage regulator 124 is to minimize the impact of voltage variations generated by the first photovoltaic cell 121 and the second photovoltaic cell 122 on the voltages presented to the plurality of personal data devices 150 by the charger plug 103 and the charger port 104.

In the first potential embodiment of the disclosure, the voltage regulator 124 is a Zener diode 171. The Zener diode 171 is further defined with a fifth anode 235 and a fifth cathode 245. The Zener diode 171 is an electrical device that creates a constant voltage reference within the charger circuit 102 that is relatively insensitive to voltage fluctuations generated by a photovoltaic cell selected from the group consisting of the first photovoltaic cell 121 and the second photovoltaic cell 122. The Zener diode 171 is a readily and commercially available device. The Zener diode 171 is selected such that any variations across the Zener diode 171 are within the selected design specifications of the invention 100. The use of a Zener diode 171 is well-known and documented in the electrical arts.

The limit resistor 125 is an electrical device. The limit resistor 125 limits the flow of electricity through the Zener diode 171.

The following four paragraphs describe the assembly of the invention 100.

The hinge 142 attaches the barrier 141 to the container 111 such that the barrier 141 encloses the cavity 112. The second photovoltaic cell 122 attaches to the interior surface of the barrier 141 such that the second photovoltaic cell 122 is enclosed in the cavity 112 when the hinged door 113 is in the closed position. The first photovoltaic cell 121 attaches to the rear face of the cavity 112 such that the first photovoltaic cell 121 is exposed to light when the hinged door 113 is in the open position.

The first positive terminal 201 of the first photovoltaic cell 121 electrically connects to the first anode 231 of the first diode 161. The first cathode 241 of the first diode 161 electrically connects to the first lead 221 of the limit resistor 125. The second positive terminal 202 of the second photovoltaic cell 122 electrically connects to the second anode 232 of the second diode 162. The second cathode 242 of the second diode 162 electrically connects to the first lead 221 of the limit resistor 125.

The second lead 222 of the limit resistor 125 electrically connects to the fifth cathode 245 of the Zener diode 171. The second lead 222 of the limit resistor 125 electrically connects to the third anode 233 of the third diode 163. The second lead 222 of the limit resistor 125 electrically connects to the fourth anode 234 of the fourth diode 164. The third cathode 243 of the third diode 163 electrically connects to the third lead 223 of the charger plug 103. The fourth cathode 244 of the fourth diode 164 electrically connects to the fifth lead 225 of the charger port 104. The third lead 223 of the charger plug 103 electrically connects to the third positive terminal 203 of the first battery 153. The fifth lead 225 of the charger port 104 electrically connects to the fourth positive terminal 204 of the second battery 154.

The third negative terminal 213 of the first battery 153 electrically connects to the fourth lead 224 of the charger plug 103. The fourth negative terminal 214 of the second battery 154 electrically connects to the sixth lead 226 of the charger port 104. The fourth lead 224 of the charger plug 103 electrically connects to the first negative terminal 211 of the first photovoltaic cell 121. The sixth lead 226 of the charger port 104 electrically connects to the first negative terminal 211 of the first photovoltaic cell 121. The fifth anode 235 of the Zener diode 171 electrically connects to the first negative terminal 211 of the first photovoltaic cell 121. The second negative terminal 212 of the second photovoltaic cell 122 electrically connects to the first negative terminal 211 of the first photovoltaic cell 121.

The following definitions were used in this disclosure:

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter, the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a chemical device consisting of one or more cells, in which chemical energy is converted into electricity and used as a source of power.

Cavity: As used in this disclosure, a cavity is an empty space or negative space that is formed within an object.

Diode: As used in this disclosure, a diode is a two terminal semiconductor device that allows current flow in only one direction. The two terminals are called the anode and the cathode. Electric current is allowed to pass from the anode to the cathode.

Door: As used in this disclosure, a door is a movable or removable barrier that is attached to the wall of a room or the surface of a container for the purpose of allowing or preventing access through an aperture into the room or container.

Hinge: As used in this disclosure, a hinge is a device that permits the turning, rotating, or pivoting of a first object relative to a second object.

Lead: As used in this disclosure, a lead is a conductor that is physically used to electrically connect an electrical component into a larger circuit assembly.

Limit Resistor: As used in this disclosure, a limit resistor is an electrical resistor that is used to limit the flow of electric current through an electrical circuit.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Photovoltaic Cell: As used in this disclosure, a photovoltaic cell is an electrical device that directly converts light energy into electrical energy.

Pivot: As used in this disclosure, a pivot is a rod or shaft around which an object rotates or swings.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk-like appearance.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Rectangular Block: As used in this disclosure, a rectangular block refers to a three-dimensional structure comprising six rectangular surfaces formed at right angles. Within this disclosure, a rectangular block may further comprise rounded edges and corners.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rounded: A used in this disclosure, the term rounded refers to the replacement of an apex, vertex, or edge or brink of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Shell: As used in this disclosure, a shell is a structure that forms an outer covering intended to contain an object. Shells are often, but not necessarily, rigid or semi-rigid structures that are intended to protect the object contained within it.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

Voltage Regulator: As used in this disclosure, a voltage regulator refers to an electrical circuit that takes unregulated voltage as its power input and provides a constant output voltage independent of variations to input power supply voltage or output, or load, current.

Zener Diode: As used in this disclosure, a Zener diode is a two-terminal electrical device that is used to generate a known voltage that is relatively independent variations in the voltage applied to the Zener diode.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, The invention is to be limited only by the scope of the following claims and their equivalents.

The inventor claims:

1. A charging arrangement apparatus comprising:
a protective shell, a charger circuit, a charger plug, and a charger port;
wherein the charger circuit, the charger plug, and the charger port attach to the protective shell;
wherein the charging arrangement apparatus is configured for use with a plurality of personal data devices;
wherein the plurality of personal data devices comprises a first personal data device and a second personal data device;
wherein the first personal data device is placed in the protective shell;
wherein the first personal data device further comprises a first battery;
wherein the first battery is a rechargeable battery;
wherein the second personal data device further comprises a second battery;
wherein the first battery is further defined with a first positive terminal and a first negative terminal;
wherein the second battery is further defined with a second positive terminal and a second negative terminal;
wherein the second battery is a rechargeable battery;
wherein the charger plug recharges the first battery;
wherein the charger port recharges the second battery;
wherein the charger circuit provides a regulated voltage to the charger plug and the charger port;
wherein the charger circuit is a solar powered electrical circuit;
wherein the charger circuit is sized such that the charger circuit can simultaneously recharge the first battery and the second battery;
wherein the charger plug is an electrical device;
wherein the charger plug is further defined with a first lead and a second lead;
wherein the charger port is further defined with a third lead and a fourth lead;
wherein the charger plug connects the charger circuit to the first battery such that the charger plug reverses the polarity of the first battery.

2. The charging arrangement apparatus according to claim 1 wherein the charger port connects the charger circuit to the second battery such that the charger port reverses the polarity of the second battery.

3. The charging arrangement apparatus according to claim 2
wherein the protective shell is a semi-rigid structure;
wherein the protective shell is a hollow structure;
wherein the protective shell forms the shape of a rounded rectangular block;
wherein the charger plug mounts within the hollow space of the container;
wherein the charger plug electrically connects to the first personal data device as the first personal data device is inserted into the protective shell.

4. The charging arrangement apparatus according to claim 3
wherein the protective shell comprises a container, a cavity, and a hinged door;
wherein the hinged door attaches to the container;
wherein the cavity is formed in a surface of the container;
wherein the container is a semi-rigid structure that is sized to receive the first personal data device;
wherein the container is a hollow structure;
wherein the cavity does not form an aperture into the hollow interior of the container.

5. The charging arrangement apparatus according to claim 4
wherein the container comprises a device aperture and a port aperture;
wherein the device aperture is an opening formed in a face of the container;
wherein the port aperture is an opening formed through the container;
wherein the first personal data device is inserted into the container through the device aperture.

6. The charging arrangement apparatus according to claim 5 wherein the charger port mounts in the port aperture such that a plug inserts through the port aperture into the charger port.

7. The charging arrangement apparatus according to claim 6
wherein the cavity is a negative space formed in the face of the container that is distal from the face of the rectangular block structure of the container that has the device aperture;
wherein the cavity is a negative space;
wherein the cavity is formed in the face of the container that is distal from the face of the rectangular block structure of the container that has the device aperture.

8. The charging arrangement apparatus according to claim 7
wherein the hinged door is a rotating plate;
wherein the hinged door controls access into the cavity;
wherein the cavity is further defined with a rear face;
wherein the rear face is a surface of the cavity that is distal from the barrier when the hinged door is in a closed position;
wherein if the hinged door is rotated away from the cavity, the cavity is said to be in an open position;
wherein if the hinged door is positioned over the cavity, the cavity is said to be in a closed position;
wherein the hinged door is opened to initiate the operation of the charger circuit.

9. The charging arrangement apparatus according to claim 8
wherein the hinged door comprises a barrier and a hinge;
wherein the barrier is a plate structure;
wherein the barrier is sized to enclose the cavity;
wherein the barrier is further defined with an interior surface and an exterior surface;
wherein the hinge attaches the barrier to the container such that the barrier encloses the cavity.

10. The charging arrangement apparatus according to claim 9
wherein the charger circuit comprises a first photovoltaic cell, a second photovoltaic cell, a plurality of diodes, a voltage regulator, and a limit resistor;
wherein the first photovoltaic cell, the second photovoltaic cell, the plurality of diodes, the voltage regulator, and the limit resistor are electrically interconnected;
wherein the first photovoltaic cell is further defined with a third positive terminal and a third negative terminal;
wherein the second photovoltaic cell is further defined with a fourth positive terminal and a fourth negative terminal;
wherein the limit resistor is further defined with a fifth lead and a sixth lead.

11. The charging arrangement apparatus according to claim 10
wherein the cavity is sized to receive the first photovoltaic cell and the second photovoltaic cell when the hinged door is in the closed position;

wherein the first photovoltaic cell is permanently attached to the rear face of the cavity such that the first photovoltaic cell is exposed to light when the hinged door is in an open position;

wherein the second photovoltaic cell attaches to the surface of the barrier that forms the interior surface of the cavity;

wherein the second photovoltaic cell attaches to the interior surface of the hinged door.

12. The charging arrangement apparatus according to claim 11 wherein the first photovoltaic cell is an electrical device that directly converts light into electricity using the photoelectric effect;

wherein the second photovoltaic cell is an electrical device that directly converts light into electricity using the photoelectric effect;

wherein each of the plurality of diodes is an electrical device that limits the flow of electric current to a single direction;

wherein the voltage regulator is an electrical circuit;

wherein the voltage regulator maintains a constant voltage at the charger plug and the charger port;

wherein the limit resistor is an electrical device;

wherein the limit resistor limits electrical flow into the voltage regulator.

13. The charging arrangement apparatus according to claim 12 wherein the plurality of diodes electrically isolate the first photovoltaic cell and the second photovoltaic cell from the voltage regulator;

wherein the plurality of diodes electrically isolate the voltage regulator from the charger plug and the charger port.

14. The charging arrangement apparatus according to claim 13 wherein the plurality of diodes comprises a first diode, a second diode, a third diode, and a fourth diode;

wherein the first diode prevents the backflow of electric current into the first photovoltaic cell from the second photovoltaic cell;

wherein the second diode prevents the backflow of electric current of into the second photovoltaic cell from the first photovoltaic cell;

wherein the third diode prevents the backflow of electric current from the first battery into the charger circuit;

wherein the fourth diode prevents the backflow of electric current from the second battery into the charger circuit;

wherein the first diode is further defined with a first anode and a first cathode;

wherein the second diode is further defined with a second anode and a second cathode;

wherein the third diode is further defined with a third anode and a third cathode;

wherein the fourth diode is further defined with a fourth anode and a fourth cathode.

15. The charging arrangement apparatus according to claim 14 wherein the voltage regulator is a Zener diode;

wherein the Zener diode is further defined with a fifth anode and a fifth cathode;

wherein the limit resistor limits the flow of electricity through the Zener diode.

16. The charging arrangement apparatus according to claim 15 wherein the second photovoltaic cell attaches to the interior surface of the barrier such that the second photovoltaic cell is enclosed in the cavity when the hinged door is in the closed position;

wherein the first photovoltaic cell attaches to the rear face of the cavity such that the first photovoltaic cell is exposed to light when the hinged door is in the open position.

17. The charging arrangement apparatus according to claim 16 wherein the third positive terminal of the first photovoltaic cell electrically connects to the first anode of the first diode;

wherein the first cathode of the first diode electrically connects to the fifth lead of the limit resistor;

wherein the fourth positive terminal of the second photovoltaic cell electrically connects to the second anode of the second diode;

wherein the second cathode of the second diode electrically connects to the fifth lead of the limit resistor;

wherein the sixth lead of the limit resistor electrically connects to the fifth cathode of the Zener diode;

wherein the sixth lead of the limit resistor electrically connects to the third anode of the third diode;

wherein the sixth lead of the limit resistor electrically connects to the fourth anode of the fourth diode;

wherein the third cathode of the third diode electrically connects to the first lead of the charger plug;

wherein the fourth cathode of the fourth diode electrically connects to the third lead of the charger port;

wherein the first of the charger plug electrically connects to the first positive terminal of the first battery;

wherein the third lead of the charger port electrically connects to the second positive terminal of the second battery;

wherein the first negative terminal of the first battery electrically connects to the second lead of the charger plug;

wherein the second negative terminal of the second battery electrically connects to the fourth lead of the charger port;

wherein the second lead of the charger plug electrically connects to the third negative terminal of the first photovoltaic cell;

wherein the fourth lead of the charger port electrically connects to the third negative terminal of the first photovoltaic cell;

wherein the fifth anode of the Zener diode electrically connects to the third negative terminal of the first photovoltaic cell;

wherein the fourth negative terminal of the second photovoltaic cell electrically connects to the third negative terminal of the first photovoltaic cell.

18. The charging arrangement apparatus according to claim 17 wherein the charger plug is a USB micro plug;

wherein the charger port is a USB A plug.

* * * * *